United States Patent [19]
Beccaceci
[11] Patent Number: 4,869,482
[45] Date of Patent: Sep. 26, 1989

[54] TOOL FOR LOOSENING A SEIZED BALL JOINT IN A MOTOR VEHICLE

[76] Inventor: Rodolfo Beccaceci, 16 Kastal Dr., Ridge, N.Y. 11961

[21] Appl. No.: 268,034
[22] Filed: Nov. 7, 1988
[51] Int. Cl.[4] .............................................. B23P 19/04
[52] U.S. Cl. .................................... 269/239; 269/253; 269/256; 269/267; 269/275
[58] Field of Search ................. 29/253, 254, 255, 239, 29/256, 257, 267, 268, 278, 280, 275; 81/177.1, 177.85

[56] References Cited

U.S. PATENT DOCUMENTS 2,664,620 1/1954 Beasley ................................ 29/253
3,845,538 11/1974 Demler ................................ 29/267
4,236,290 12/1980 McPherson ........................... 29/239

FOREIGN PATENT DOCUMENTS 1561011 2/1980 United Kingdom .................. 29/268

*Primary Examiner*—Robert C. Watson
*Attorney, Agent, or Firm*—Michael I. Kroll

[57] ABSTRACT

A tool for loosening a seized ball joint from a tie rod in a motor vehicle and consists of a shank having a stationary jaw with a wedged shaped seat so that the seized ball joint can sit in the wedged shaped seat. A movable jaw is pivotly secured to the shank while a puller bolt is transversely threaded through the shank causing the moveable jaw to pivot to press against end of the seized ball joint. A handle with a removable handle extension having a support portion is threadably attached to the shank so that a hammer can hit against the support portion to loosen the seized ball joint from the tie rod.

3 Claims, 1 Drawing Sheet

TOOL FOR LOOSENING A SEIZED BALL JOINT IN A MOTOR VEHICLE

BACKGROUND OF THE INVENTION

1. Field of the Invention

The instant invention relates generally to automotive tools and more specifically it relates to a tool for loosening a seized ball joint in a motor vehicle.

2. Description of the Prior Art

Numerous automotive tools have been provided in prior art that are adapted to be used to perform various tasks when repairing different parts of motor vehicles. While these units may be suitable for the particular purpose to which they address, they would not be as suitable for the purposes of the present invention as heretofore described.

SUMMARY OF THE INVENTION

A primary object of the present invention is to provide a tool for loosening a seized ball joint in a motor vehicle that will overcome the shortcomings of the prior art devices.

Another object is to provide a tool for loosening a seized ball joint in a motor vehicle that will combine the features of a ball joint separator tool and a lever type ball joint remover tool.

An additional object is to provide a tool for loosening a seized ball joint in a motor vehicle in which the handle can be varied in length for different lever needs.

A further object is to provide a tool for loosening a seized ball joint in a motor vehicle that is simple and easy to use.

A still further object is to provide a tool for loosening a seized ball joint in a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
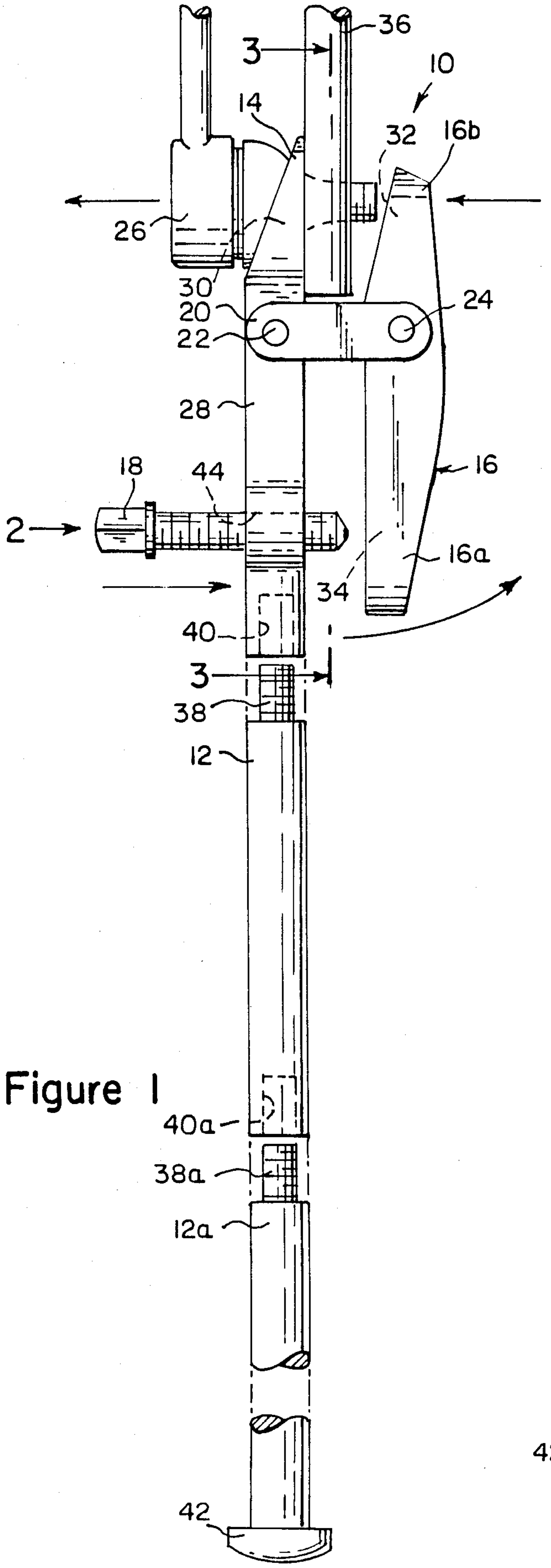
FIG. 1 is a side view of the invention partly exploded and broken away.
Figure 2:
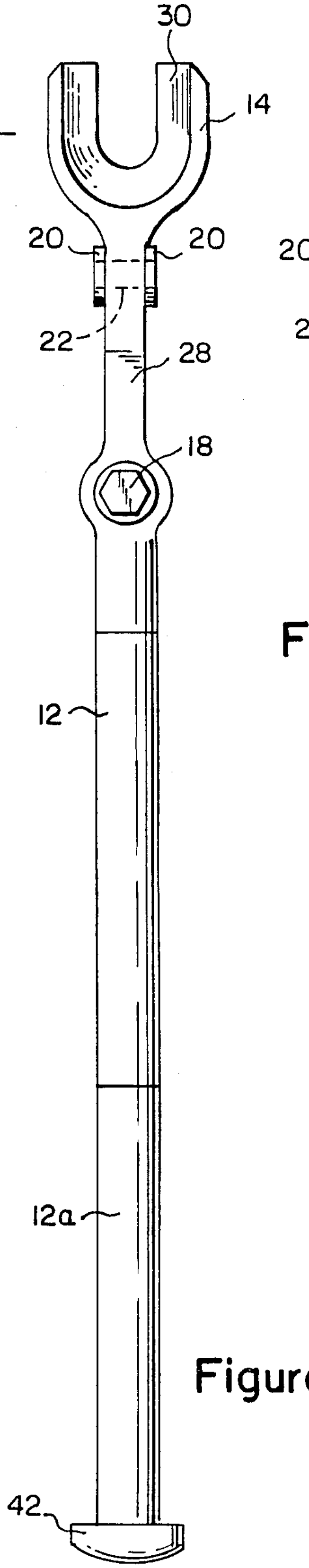
FIG. 2 is an end view taken in direction of arrow 20 in FIG. 1.
Figure 3:
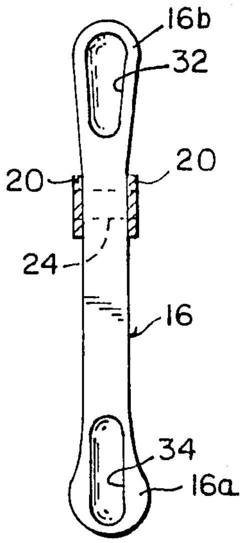
FIG. 3 is a cross sectional view taken along line 3—3 in FIG. 1.

Turning now descriptively to the drawings, in which similar reference characters denote similar elements throughout the several views, the figures illustrate a tool 10 for loosening a seized ball joint 26 from a tie rod 36 in a motor vehicle (not shown) which consists in combination a shank 28 that has a threaded hole 40 at one end, a U-shaped stationary jaw 14 with a wedged shaped seat 30 at other end and a transverse threaded aperture 44 near the threaded hole 40, so that the seized ball joint 26 can sit in the wedged shaped seat 30 of the stationary jaw 14.

A pair of arms 20 are secured in a parallel transverse relationship to the shank 28 near the stationary jaw 14. A movable jaw 16 has an upper seat 32 in upper portion **16*b* and a lower seat 34 in lower portion 16*a*. The movable jaw 16 is pivotly secured between the arms 20 s that the upper seat 32 is in a general alignment with the wedged shaped seat 30 in the stationary jaw 14**.

A puller bolt 18 is threaded into the transverse threaded aperture 44 to engage with the lower seat 34 in the lower portion **16*a* of the movable jaw 16 causing the movable jaw to pivot and the upper seat 32 in the upper portion 16*b* to press against end of the seized ball joint 26**.

A handle 12 is provided that has a threaded portion 38 at one end and a threaded hole **40*a* at other end so that the threaded portion 38 can engage with the threaded hole 40 in the shank 28. A removable handle extension 12*a* is also provided and has a threaded portion 38*a* at one end and a support portion 42 at other end so that the threaded portion 38*a* can engage with the threaded hole 40*a* in the handle 12. A hammer (not shown) can hit against the support portion 42 to loosen the seized ball joint 26** from the tie rod.

A pair of rivet pins 22 are for securing the arms 20 to the shank 28 while a pair of pivot pins 24 are for pivotly securing the movable jaw 16 to the arms 20.

LIST OF REFERENCE NUMBERS

10 tool
12 handle
**12*a*** removable handle extension
14 U-shaped stationary jaw
16 movable jaw
**16*a*** lower portion
**16*b*** upper portion
18 puller bolt
20 arm
22 rivet pin
24 pivot pin
26 seized ball joint
28 shank
30 wedged shaped seat in stationary jaw
32 upper seat in movable jaw
34 lower seat in movable jaw
36 tie rod
38 threaded portion on handle
**38*a*** threaded portion on handle extension
40 threaded hole in shank
**40*a*** threaded hole in handle
42 support portion
44 transverse threaded aperture in shank for puller bolt It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

With further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A tool for loosening a seized ball joint from a tie rod in a motor vehicle which comprises in combination:

(a) a shank having a threaded hole at one end, a U-shaped stationary jaw with a wedged shaped seat at other end and a transverse threaded aperture near said threaded hole, so that the seized ball joint can sit in said wedged shaped seat of said stationary jaw;

(b) a pair of arms secured in a parallel transverse relationship to said shank near said stationary jaw;

(c) a movable jaw having an upper seat in upper portion and a lower seat in lower portion, said movable jaw pivotly secured between said arms so that said upper seat is in a general alignment with said wedged shaped seat in said stationary jaw;

(d) a puller bolt threaded into said transverse threaded aperture to engage with said lower seat in said lower portion of said movable jaw causing said movable jaw to pivot and said upper seat in said upper portion to press against end of the seized ball joint;

(e) a handle having a threaded portion at one end and a threaded hole at other end so that said threaded portion can engage with said threaded hole in said shank; and (f) a removable handle extension having a threaded portion at one end and a support portion at other end so that said threaded portion can engage with said threaded hole in said handle and a hammer can hit against said support portion to loosen the seized ball joint from the tie rod.

2. A tool as recited in claim 1, further comprising a pair of rivet pins for securing said arms to said shank.

3. A tool as recited in claim 2, further comprising a pair of pivot pins for pivotly securing said movable jaw to said arms.

* * * * *